(12) United States Patent
Porten et al.

(10) Patent No.: US 9,438,137 B2
(45) Date of Patent: Sep. 6, 2016

(54) METHOD AND DEVICE FOR OPERATING A PIEZOELECTRIC ACTUATOR

(75) Inventors: Guido Porten, Vaihingen/Enz (DE); Jan-Mathias Meng, Ditzingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/111,239

(22) PCT Filed: Mar. 16, 2012

(86) PCT No.: PCT/EP2012/054639
§ 371 (c)(1),
(2), (4) Date: Dec. 18, 2013

(87) PCT Pub. No.: WO2012/139851
PCT Pub. Date: Oct. 18, 2012

(65) Prior Publication Data
US 2014/0125257 A1    May 8, 2014

(30) Foreign Application Priority Data
Apr. 14, 2011   (DE) .................. 10 2011 007 359

(51) Int. Cl.
*H01L 41/22* (2013.01)
*H02N 2/00* (2006.01)
*F02D 41/20* (2006.01)
*F02D 41/24* (2006.01)

(52) U.S. Cl.
CPC ........ *H02N 2/0075* (2013.01); *F02D 41/2096* (2013.01); *F02D 41/247* (2013.01); *F02D 2041/2065* (2013.01)

(58) Field of Classification Search
USPC ............... 604/891.1; 310/311; 417/413.2
See application file for complete search history.

(56) References Cited

U.S. PATENT DOCUMENTS

| 7,191,051 | B2 | 3/2007 | Rueger et al. | |
|---|---|---|---|---|
| 2007/0170814 | A1* | 7/2007 | Sykes et al. | 310/317 |
| 2007/0235555 | A1* | 10/2007 | Helf | A01M 1/205 239/102.2 |
| 2007/0283930 | A1* | 12/2007 | Jung | F02M 37/0052 123/447 |
| 2009/0090333 | A1* | 4/2009 | Spadafora et al. | 123/494 |
| 2009/0209945 | A1* | 8/2009 | Lobl | A61M 5/14224 604/891.1 |

FOREIGN PATENT DOCUMENTS

| CN | 101646951 A | 2/2010 |
|---|---|---|
| CN | 101802379 A | 8/2010 |
| DE | 199 45 618 | 3/2001 |
| DE | 10 2004 018 211 | 11/2005 |
| DE | 10 2005 036 956 | 2/2007 |
| DE | 102005036956 A1 * | 2/2007 |

(Continued)

OTHER PUBLICATIONS

International Search Report, PCT International Application No. PCT/EP2012/054639, dated Jul. 26, 2012.

*Primary Examiner* — Eduardo Colon Santana
*Assistant Examiner* — Cortez Cook
(74) *Attorney, Agent, or Firm* — Norton Rose Fulbright US LLP

(57) ABSTRACT

A method for operating a piezoelectric actuator which may be activated with the aid of an activation signal. The piezoelectric actuator is operable in a passive and in an active operating mode. The piezoelectric actuator is activated without a functional operating request if the piezoelectric actuator is in a passive operating mode.

17 Claims, 1 Drawing Sheet

(56) References Cited

FOREIGN PATENT DOCUMENTS

| JP | S 61-98165 | 5/1986 |
| JP | S 63-50080 | 3/1988 |
| JP | 2008-086119 | 4/2008 |
| JP | 2009-086119 | 4/2009 |
| JP | 2009261069 A | 11/2009 |
| WO | WO 2004/048763 | 6/2004 |

* cited by examiner

METHOD AND DEVICE FOR OPERATING A PIEZOELECTRIC ACTUATOR

FIELD

The present invention relates generally to a method for operating a piezoelectric actuator. The present invention further relates to a device for operating a piezoelectric actuator. The present invention finally relates to an internal combustion engine having a device of this type.

BACKGROUND INFORMATION

There are numerous technical applications for piezoelectric actuators, such as a piezoelectric actuator for controlling the position of valve needles of injectors in fuel injection systems. The base bodies of conventional piezoelectric actuators are formed by a piezoceramic, which expands due to the piezoelectric effect when an electrical voltage or a charge is applied.

One problem in using piezoceramics previously was that piezoceramics have a certain sensitivity to temperature fluctuations. In practice, frequent temperature changes at piezoelectric actuators influence their effectiveness in such a way that the actuator lift is reduced over time. When the piezoelectric actuator is used in injectors, a reduction of the actuator lift results in a displacement of the opening and closing timing of the valve needle and thus ultimately in a faulty injection quantity.

German Patent Application No. DE 10 2004 018 211 A1 describes a piezoelectric actuator which activates a valve element of a fuel injection device. It is checked whether the request exists for starting the internal combustion engine, and a polarization of the piezoelectric actuator is requested if the result of the check is positive.

SUMMARY

An object of the present invention is to provide a method and a device for operating a piezoelectric actuator, resulting in a practicable approach for increasing the robustness and extending the service life of piezoelectric actuators using equipment of low complexity.

An example method is used for operating a piezoelectric actuator which may be activated with the aid of an activation signal, in particular an activation voltage. The activation signal may also be an electric activation current or an electric activation charge. The piezoelectric actuator is operable in a passive and in an active operating mode. In this connection, the piezoelectric actuator is activated if it is in a passive operating mode. In other words, this means that the piezoelectric actuator is activated solely for the purpose of preventing the above-described disadvantageous effects, which occur in a passive operating mode of the piezoelectric actuator. In the wording of this application, the term "passive operating mode of the piezoelectric actuator" is to be understood as an operating mode of the piezoelectric actuator, in which the piezoelectric actuator is in an idle state, i.e., the functional activation is not requested (this means that no activation signal is present at the piezoelectric actuator or a constant activation signal is present at the piezoelectric actuator). Accordingly, in the wording of this application, the term "active operating mode of the piezoelectric actuator" is to be understood as an operating mode of the piezoelectric actuator, in which the piezoelectric actuator is activated functionally.

In one embodiment variant of the example method according to the present invention, the piezoelectric actuator is activated if the piezoelectric actuator is in the passive operating mode for a predetermined period of time. Thus, the maximum duration of a passive operating phase may be limited, in order to minimize the time in which the above-described disadvantageous effects occur.

In order to ensure the lift capability of the piezoelectric injectors during passive operation across aging and run time, in one embodiment variant of the present invention, a temperature is ascertained in the area of the piezoelectric actuator and a change in the ascertained temperature is determined. In this case, the piezoelectric actuator is activated by the activation signal if the change in temperature exceeds a predefined value.

Temperature is a variable that may be measured relatively easily and accurately, for which reason the temperature is measured in one embodiment of the method according to the present invention.

In another embodiment of the example method according to the present invention, the temperature is calculated based on a model. The model-based calculation has the advantage that it is possible to use measured values of sensors, which are already present in the vehicle in any case.

Since the cyclic thermal stress is particularly detrimental to the properties of the piezoceramic, in particular in the passive operating mode (also referred to as "passive operation"), in one embodiment variant of the example method according to the present invention, it is regularly checked whether the piezoelectric actuator is in the passive operating mode.

According to one embodiment of the example method according to the present invention, the predefined value is formed by a temperature difference. The temperature difference between a first value of the temperature at a first point in time and a second value of the temperature at a second point in time is a measure of the thermal stress on the piezoelectric actuator which is easily measured.

If the temperature curve in the area of the piezoelectric actuator changes, a thermal stress of the piezoelectric actuator occurs which is proportional to the temperature change rate, which—as described above—results in unacceptable inaccuracies in the injection quantity after prolonged use of the piezoelectric actuator in injectors. For that reason, the predefined value in one embodiment variant of the method according to the present invention is formed by a temperature change rate (defined, for example, as the time derivative of the temperature).

In one embodiment variant of the method according to the present invention, the piezoelectric actuator is activated if one or multiple temperature change(s) is/are detected. This prevents or at least reduces a loss of the lift capacity over the service life of the piezoelectric actuator.

The present invention further relates to a device for operating a piezoelectric actuator which may be activated with the aid of an activation signal, having a detector for detecting whether the piezoelectric actuator is operated in an active or a passive operating mode, and having a control device (24) which is designed for activating the piezoelectric actuator (12) with the aid of the activation signal if the piezoelectric actuator is in passive operation.

With regard to the advantages of the device, reference is made to the previous description of the method according to the present invention, which may be carried out with the aid of the device, resulting in the above-described advantages. It is understood that the features, properties and advantages of the method according to the present invention are accordingly also applicable to the device according to the present invention and are usable in it.

One advantage which may be achieved by the present invention is that it exhibits an effective measure for preventing an impending reduction in the service life of the piezoelectric actuator.

DETAILED DESCRIPTION OF EXAMPLE EMBODIMENTS

Figure 1:
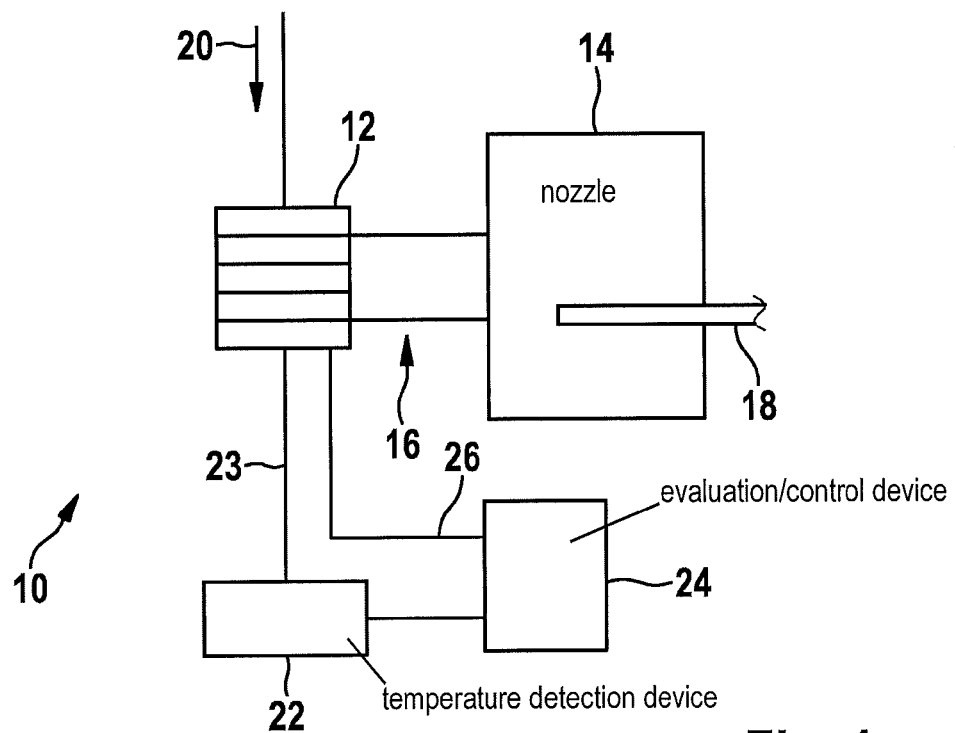
FIG. 1 shows a block diagram of an example injector according to the present invention.

FIG. 1 shows a block diagram illustrating an exemplary function of an example injector 10 according to the present invention. In this connection, the components of injector 10 which are used for the implementation of the present invention are shown in a highly schematic diagram. A piezoelectric actuator 12 situated within an internal combustion engine is designed for controlling the position of a valve needle 18 of injector 10 in a fuel injection system. In the activated state, piezoelectric actuator 12 acts on valve needle 18 indirectly via a valve element 16 which is situated between piezoelectric actuator 12 and nozzle 14. It is of course also possible that valve needle 18 is activated directly by piezoelectric actuator 12. Piezoelectric actuator 12 is activated by a signal, which may be an electric current signal, a voltage signal or an electric charge signal.

System 10 further includes a temperature detection device 22, via which a temperature at piezoelectric actuator 12 is ascertained using a model.

An evaluation/control device 24 checks whether a change in the temperature at piezoelectric actuator 12 ascertained by temperature detection device 22 lies within a setpoint range or exceeds a predefined setpoint value. Evaluation/control device 24 is furthermore able to recognize different operating modes of piezoelectric actuator 12. For this purpose, data relating to the present operating mode of piezoelectric actuator 12 are transferred via a data line 26 to evaluation/control device 24 and are evaluated by the latter for ascertaining the present operating mode. Evaluation/control device 24 is in particular able to recognize a passive operation of piezoelectric actuator 12 by evaluating the data.

Piezoelectric actuator 12 may be operated in an active operating mode and in a passive operating mode. The active operating mode is an operating mode in which the piezoelectric actuator is functionally operated regularly or permanently. The passive operating mode is an operating mode in which the piezoelectric actuator is in an idle state in which no functional activation is requested. In this state, the piezoelectric actuator is consequently not activated, and not moved. Due to a number of possible temperature influences, a loss of lift capacity may occur, in particular, when the piezoelectric actuator is operated in the passive operating mode. Such temperature influences may be: an excessively high temperature value which exceeds a critical temperature value, a change in temperature, a one-time change in temperature, or a number of temperature cycles or temperature changes.

In internal combustion engines having a dual fuel injection device, in which the direct injection into the combustion chamber occurs using a first injector at comparatively high pressure, and an intake-manifold injection into the air intake channel using a second injector occurs at relatively low pressure, the advantages of both types of injection may be utilized by an appropriate change in operating modes.

Piezoelectric actuator 12 generally displays the mechanical property of losing lift capacity during passive cyclic thermal stress. In the case of internal combustion engines which are optionally operated using liquid fuel and gas, in particular liquefied petroleum gas or natural gas, the aforementioned problem may occur in a pure gas operation or in operation via intake-manifold injection of the internal combustion engine. For that reason, piezoelectric actuator 12 is activated in such a passive operation, for example, regularly or under predetermined conditions. This activation takes place without a functional activation request only to prevent the above-mentioned disadvantages. A predetermined condition may exist, for example, in a certain number of temperature cycles or temperature changes. Piezoelectric actuator 12 may also be activated after a predetermined time without consideration of the temperature.

For this purpose, evaluation/control device 24 is designed for controlling and activating piezoelectric actuator 12 if a passive operation of piezoelectric actuator 12 is detected, and at the same time the temperature change deviates from the setpoint value range, or exceeds the predefined setpoint value or a predefined time has elapsed. For activating piezoelectric actuator 12, an electric current 20, whose curve shape over time has a defined profile, is conducted through piezoelectric actuator 12. Energizing causes an expansion of piezoelectric actuator 12 to be changed, and as a result, valve element 16 and finally also valve needle 18 are activated.

The activation of valve needle 18 produces pressure differences between a seat of valve needle 18 and the upper part of valve needle 18, causing valve needle 18 to be opened. This may prevent a change in the lift capacity during passive operation.

Figure 2:
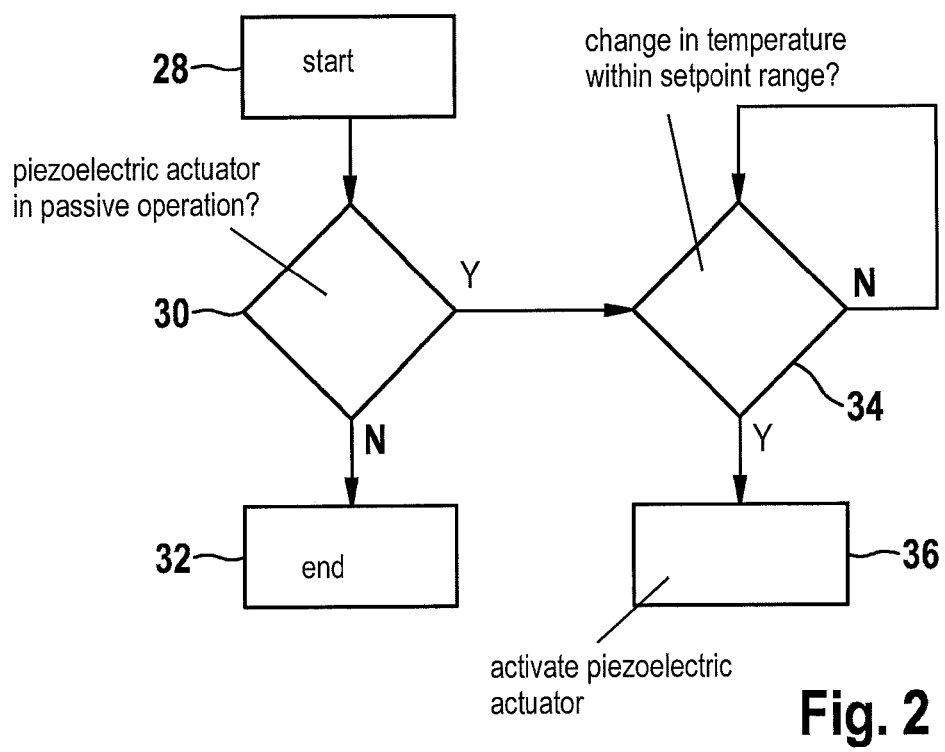
FIG. 2 shows a flow chart of an example method according to the present invention.

FIG. 2 shows a flow chart of the example method according to the present invention for operating piezoelectric actuator 12. The method according to the present invention is started in a starting step 28. After the start, it is first checked in an operating mode test step 30 if piezoelectric actuator 12 is in a passive operation. If the result of the check in operating mode test step 30 is negative (i.e., piezoelectric actuator 12 is not in passive operation), the method ends in termination step 32.

If the result of the check in operating mode test step 30 is positive, i.e., if it was determined that piezoelectric actuator 12 is in passive operation, the method continues in temperature change test step 34. In temperature change test step 34, it is checked whether a change in temperature at piezoelectric actuator 12 is within a predetermined setpoint range, or whether the change in temperature exceeds a predefined setpoint value.

The setpoint value may be a temperature difference delta T=T1-T2. T1 and T2 are two temperature values, which were ascertained at different points in time. The useful time interval between two measurements is dependent on the circumstances, such as the absolute temperature or the profile of the shape of the curve over time of the temperature, and is to be selected in such a way that meaningful results are achieved.

The setpoint value may also be a temperature change rate (dT/dt=time derivative of the temperature). In temperature change test step 34, it may further be checked if a temperature change or a predefined number of temperature changes were detected.

If the result of the check in temperature change test step 34 is negative, the check of the temperature change is repeated periodically until the temperature change deviates from the setpoint value range or exceeds the setpoint value or a temperature change or a predetermined number of temperature changes is present. If the result of the check in temperature change test step 34 is positive, the method is continued in activation step 36. Piezoelectric actuator 12 is activated in activation step 36. In addition to the primary fuel injection (apportionment of the fuel of one cylinder), piezoelectric actuator 12 may also be activated as a substitute for the primary fuel injection.

Although the present invention has been described above using the example of a piezoelectric actuator in an injector, it is not limited to this field of application. Instead, the present invention is basically applicable to, e.g., all actuators controlled by piezoelectric actuators, such as a piezoelectric actuator for valve lift adjustment.

What is claimed is:

1. A method for operating a piezoelectric actuator which is activated by an activation signal, the piezoelectric actuator being operable in an active and in a passive operating mode, the piezoelectric actuator being activated functionally in the active operating mode in response to a functional operating request, and being in the passive operating mode in an idle state caused by an absence of the functional operating request, the method comprising:
activating the piezoelectric actuator in the passive operating mode without the functional operating request, in response to detecting at least one of the following:
the piezoelectric actuator being in the passive operating mode for a predetermined period of time, and
a temperature condition associated with the piezoelectric actuator being met,
wherein activation of the piezoelectric actuator opens a valve, wherein the piezoelectric actuator is activated in the active operating mode such that the valve is opened in conjunction with an injection through the opened valve, and wherein the activation in the passive operating mode opens the valve without a corresponding injection.

2. The method as recited in claim 1, further comprising:
ascertaining a temperature in an area of the piezoelectric actuator at two points in time to calculate a change in temperature; and
determining, as the temperature condition, whether the change in temperature or a value derived from the change in temperature exceeds a predefined value.

3. The method as recited in claim 2, wherein the temperature is ascertained using a temperature detector.

4. The method as recited in claim 2, wherein the temperature is ascertained by calculating the temperature based on a model.

5. The method as recited in claim 2, further comprising:
regularly checking whether the piezoelectric actuator is in the passive operating mode.

6. The method as recited in claim 2, wherein the predefined value is a temperature difference.

7. The method as recited in claim 2, wherein the predefined value is a temperature change rate.

8. The method as recited in claim 2, wherein the piezoelectric actuator is activated after a plurality of temperature changes exceeding the predefined value are detected.

9. A device for operating a piezoelectric actuator which is activated by an activation signal, comprising:
a detector to detect whether the piezoelectric actuator is operated in an active or a passive operating mode, wherein the active operating mode is in response to a functional operating request, and wherein the passive operating mode is an idle state caused by an absence of the functional operating request; and
a control device configured to activate the piezoelectric actuator in the passive operating mode without the functional operating request, in response to detecting at least one of the following:
the piezoelectric actuator being in the passive operating mode for a predetermined period of time, and
a temperature condition associated with the piezoelectric actuator being met, wherein activation of the piezoelectric actuator opens a valve, wherein the piezoelectric actuator is activated in the active operating mode such that the valve is opened in conjunction with an injection through the opened valve, and wherein the activation in the passive operating mode opens the valve without a corresponding injection.

10. An internal combustion engine, comprising:
a piezoelectric actuator activated by an activation signal; and
a device that operates the piezoelectric actuator, the device including a detector to detect whether the piezoelectric actuator is operated in an active or a passive operating mode, wherein the active operating mode is in response to a functional operating request, and wherein the passive operating mode is an idle state caused by an absence of the functional operating request; and
a control device configured to activate the piezoelectric actuator in the passive operating mode without the functional operating request, in response to detecting at least one of the following:
the piezoelectric actuator being in the passive operating mode for a predetermined period of time, and
a temperature condition associated with the piezoelectric actuator being met, wherein activation of the piezoelectric actuator opens a valve, wherein the piezoelectric actuator is activated in the active operating mode such that the valve is opened in conjunction with an injection through the opened valve, and wherein the activation in the passive operating mode opens the valve without a corresponding injection.

11. A method for operating a piezoelectric actuator which is activated by an activation signal, the piezoelectric actuator being operable in an active and in a passive operating mode, the piezoelectric actuator being activated functionally in the active operating mode in response to a functional operating request, and being in the passive operating mode in an idle state caused by an absence of the functional operating request, the method comprising:
activating the piezoelectric actuator in the passive operating mode without the functional operating request, in response to detecting at least one of the following:
the piezoelectric actuator being in the passive operating mode for a predetermined period of time, and
a temperature condition associated with the piezoelectric actuator being met;
ascertaining a temperature in an area of the piezoelectric actuator at two points in time to calculate a change in temperature; and
determining, as the temperature condition, whether the change in temperature or a value derived from the change in temperature exceeds a predefined value.

12. The method as recited in claim 11, wherein the temperature is ascertained using a temperature detector.

13. The method as recited in claim 11, wherein the temperature is ascertained by calculating the temperature based on a model.

14. The method as recited in claim 11, further comprising:
regularly checking whether the piezoelectric actuator is in the passive operating mode.

15. The method as recited in claim 11, wherein the predefined value is a temperature difference.

16. The method as recited in claim 11, wherein the predefined value is a temperature change rate.

17. The method as recited in claim 11, wherein the piezoelectric actuator is activated after a plurality of temperature changes exceeding the predefined value are detected.

* * * * *